E. G. BUSSE.
BRAKE BEAM.
APPLICATION FILED MAR. 20, 1916.
1,203,469.
Patented Oct. 31, 1916.
2 SHEETS—SHEET 1.
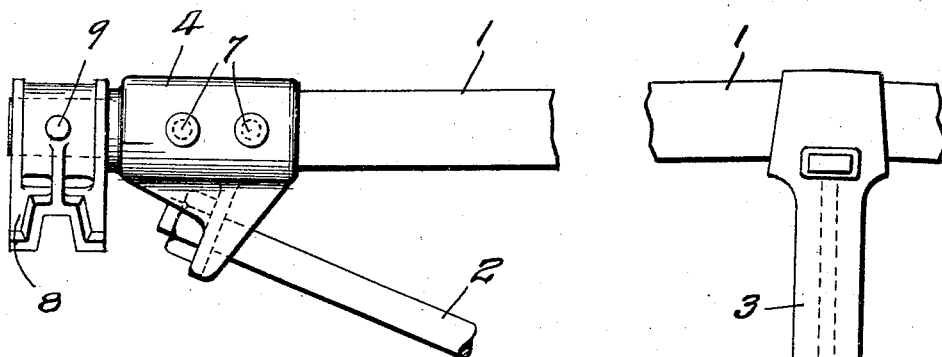
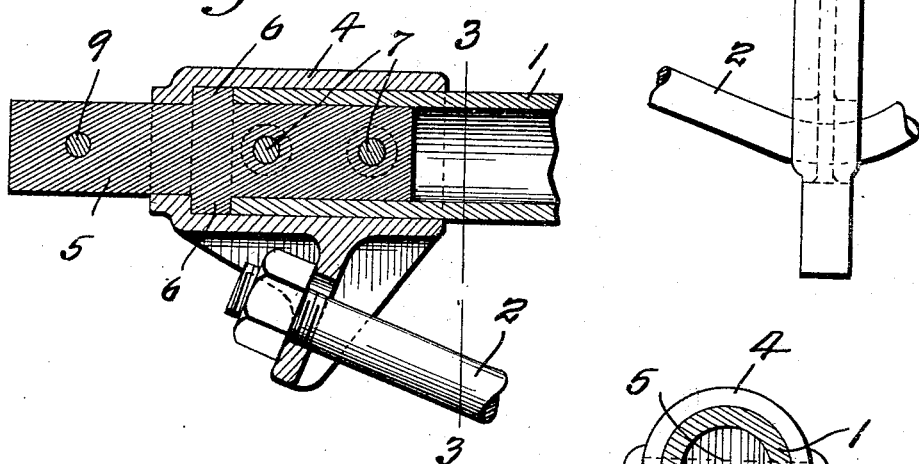
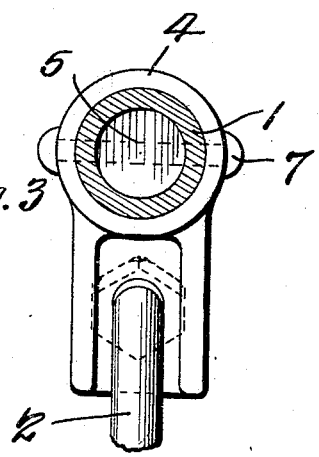
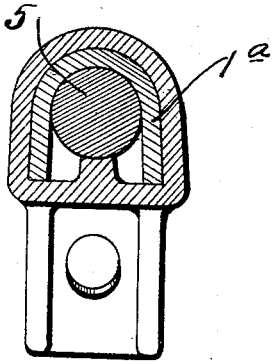
Inventor
Edwin G. Busse E. G. BUSSE.
BRAKE BEAM.
APPLICATION FILED MAR. 20, 1916.
1,203,469.
Patented Oct. 31, 1916.
2 SHEETS—SHEET 2.
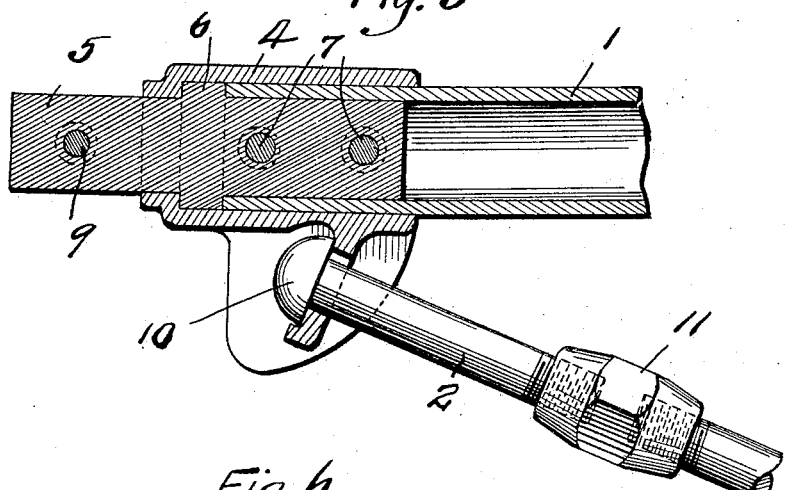
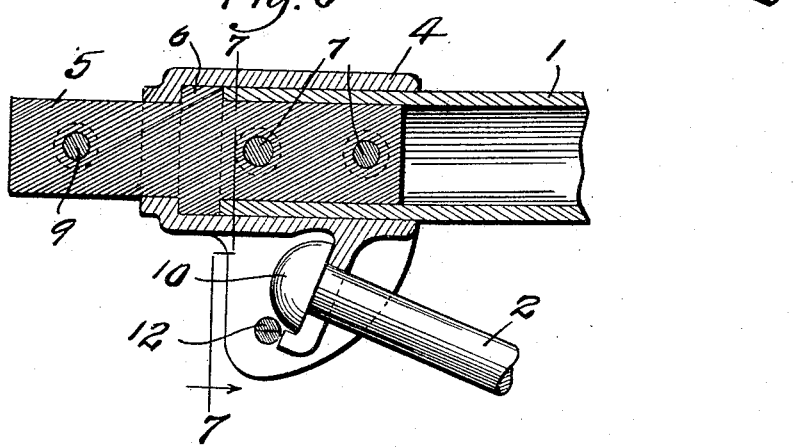
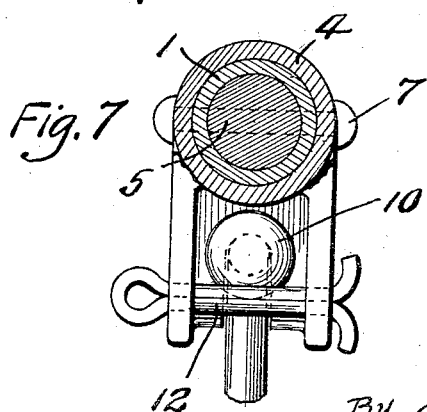
Inventor
Edwin G. Busse

UNITED STATES PATENT OFFICE.

EDWIN G. BUSSE, OF CHICAGO, ILLINOIS, ASSIGNOR TO CHICAGO RAILWAY EQUIPMENT COMPANY, OF CHICAGO, ILLINOIS, A CORPORATION OF ILLINOIS.

BRAKE-BEAM.

1,203,469.  Specification of Letters Patent.  Patented Oct. 31, 1916.

Application filed March 20, 1916. Serial No. 85,336.

*To all whom it may concern:*

Be it known that I, EDWIN G. BUSSE, a citizen of the United States, residing at Chicago, State of Illinois, have invented a certain new and useful Improvement in Brake-Beams, of which the following is a full, clear, and exact description, such as will enable others skilled in the art to which it appertains to make and use the same, reference being had to the accompanying drawings, forming part of this specification, in which—

Figure 1 is a top plan view of part of a brake beam embodying my invention. Fig. 2 is a sectional view through the end of the beam. Fig. 3 is a cross sectional view on line 3—3 of Fig. 2. Fig. 4 is a cross sectional view of a modified form taken at right angle to the compression member. Figs. 5 and 6 are sectional views of modified forms of the beam. Fig. 7 is a sectional view on line 7—7 of Fig. 6.

This invention relates to a new and useful improvement in brake beams, the object being to construct a beam in which the sleeve or trunnion on which the head is mounted, may be made of hardened steel to meet the requirements of some railroads. It has been the custom heretofore to make the sleeve or thrust member, which supports the brake head, of malleable iron, but certain railroad specifications demand that the sleeve or trunnion which supports the brake head shall be made of hardened or tool steel.

My present invention contemplates the construction of a brake beam in which hardened or tool steel may be employed.

In the drawings 1 indicates a compression member, 2 the tension member, 3 the strut, and 4 the thrust block or sleeve to which the tension member is connected, there being a nut on the end of the tension member whereby a camber may be placed in the compression member.

5 is a trunnion member of hardened or tool steel having an enlarged portion 6 arranged about its center at any desirable point intermediate its ends forming shoulders against which shoulders the compression member and thrust block impinge. One end of this trunnion member 5 is secured in place in any desired manner but preferably by rivets 7, while the opposite end extends outwardly to form a mounting for the brake head 8 which may be secured in position thereon by a bolt or rivet 9, see Fig. 1, or if the head is to be held loosely on the trunnion, cotter pin or any other well known means for fastening loose heads in place, can be used.

The compression member may be in the form of a tube, shown in Fig. 1, or it may be U-shaped as shown in Fig. 4, or other shape; and the tension member may have a nut on its end, as shown in Fig. 1, or it may be upset and provided with a head 10, as shown in Fig. 5, with a turn buckle 11, or said tension member with its upset head received in a seat, as shown in Fig. 6, may be prevented from accidental displacement by means of a cotter pin 12, as shown in Figs. 6 and 7. In the form shown in Figs. 6 and 7 the tension rod 2 is solid and in order to slip the upset ends of this solid tension rod over the shoulders on the nut seats, the compression member is cambered slightly and then allowed to spring back into position whereupon the tension rod is placed under tension and the upset ends are firmly seated in the nut seats.

In all forms of compression members shown, I prefer to use a pipe, U-shaped, V-shaped, or other shaped compression member of light construction, with the solid inserts in the ends of the compression member, the inserts of course having the trunnions on their outer ends.

I claim:

1. A brake beam composed of a compression member of light construction having a trunnion fitted in the end thereof, a thrust block embracing the end of the compression member and trunnion, there being means for holding the trunnion in position, and a truss rod engaging the thrust block.

2. A brake beam comprising a compression member, a tension member, and a strut in combination with a thrust block to which the tension member is connected, and a trunnion extending into the compression member and projecting outwardly beyond the thrust block, said trunnion having an enlarged portion forming shoulders against which the thrust block and compression member impinge.

3. A brake beam having a compression member, a strut and tension member in combination with a thrust block to which said tension member is connected, and a cotter pin extending across the end of the tension member to prevent displacement thereof.

4. A brake beam composed of a compression member of light construction, trunnions fitted in the ends of the compression member, thrust blocks embracing the ends of the compression member and trunnions, said thrust blocks having seats connected thereto, a strut, and a truss rod having upset ends engaging said seats and which are arranged in position by springing the compression member and permitting the same to return to a position in which the tension rod is placed under tension and the upset ends thereof firmly engaged in said seats.

In testimony whereof I hereunto affix my signature in the presence of two witnesses, this sixteenth day of March, 1916.

EDWIN G. BUSSE.

Witnesses:
E. T. WALKER,
R. S. DEACON.

Copies of this patent may be obtained for five cents each, by addressing the "Commissioner of Patents, Washington, D. C."